(12) United States Patent
Lieb

(10) Patent No.: US 9,032,391 B2
(45) Date of Patent: May 12, 2015

(54) SYSTEM AND METHOD FOR DYNAMICALLY CREATING EXECUTABLE FILES

(71) Applicant: Clearside, Inc., San Francisco, CA (US)

(72) Inventor: Adam Michael Lieb, San Francisco, CA (US)

(73) Assignee: Clearside, Inc., San Francisco, CA (US)

(*) Notice: Subject to any disclaimer, the term of this patent is extended or adjusted under 35 U.S.C. 154(b) by 99 days.

(21) Appl. No.: 13/841,734

(22) Filed: Mar. 15, 2013

(65) Prior Publication Data

US 2014/0007080 A1    Jan. 2, 2014

Related U.S. Application Data

(60) Provisional application No. 61/665,154, filed on Jun. 27, 2012.

(51) Int. Cl.
G06F 9/445 (2006.01)
G06Q 10/10 (2012.01)
G06F 9/44 (2006.01)

(52) U.S. Cl.
CPC ... G06F 8/61 (2013.01); G06F 8/36 (2013.01)

(58) Field of Classification Search
USPC .......................................... 717/176; 715/753
See application file for complete search history.

(56) References Cited

U.S. PATENT DOCUMENTS

| | | | |
|---|---|---|---|
| 5,768,597 A * | 6/1998 | Simm | 717/174 |
| 2002/0007393 A1 | 1/2002 | Hamel | |
| 2004/0239579 A1 | 12/2004 | Ito et al. | |
| 2008/0016155 A1 * | 1/2008 | Khalatian | 709/204 |
| 2008/0016176 A1 | 1/2008 | Leitner | |
| 2010/0111072 A1 * | 5/2010 | Hyun | 370/352 |
| 2011/0173256 A1 | 7/2011 | Khalatian | |

FOREIGN PATENT DOCUMENTS

KR    2008-0106487 A    12/2008

OTHER PUBLICATIONS

International Application No. PCT/US2013/048347 International Search Report and Written Opinion dated Oct. 18, 2013, pp. 1-8.

* cited by examiner

*Primary Examiner* — Li Zhen
*Assistant Examiner* — Hang Pan
(74) *Attorney, Agent, or Firm* — Perkins Coie LLP

(57) ABSTRACT

Techniques are disclosed for generating, on a server, executable files that are individually customized for a user. An exemplary method comprises receiving a download request from a client, the download request including a system type and one or more identification parameters; locating a pre-compiled payload that is executable on the client based on the system type; determining a configuration data for use with the pre-compiled payload based on the one or more identification parameters; and selectively generating a customized executable file for the client to download, wherein the customized executable file includes the pre-compiled payload and the configuration data. Among other benefits, some embodiments provided herein enable dynamic creation and individual customization of executable files for a user so that conventional configuration or personalization steps after the user installs the files are avoided, thereby reducing time consumed and potential confusion caused by such steps.

16 Claims, 6 Drawing Sheets

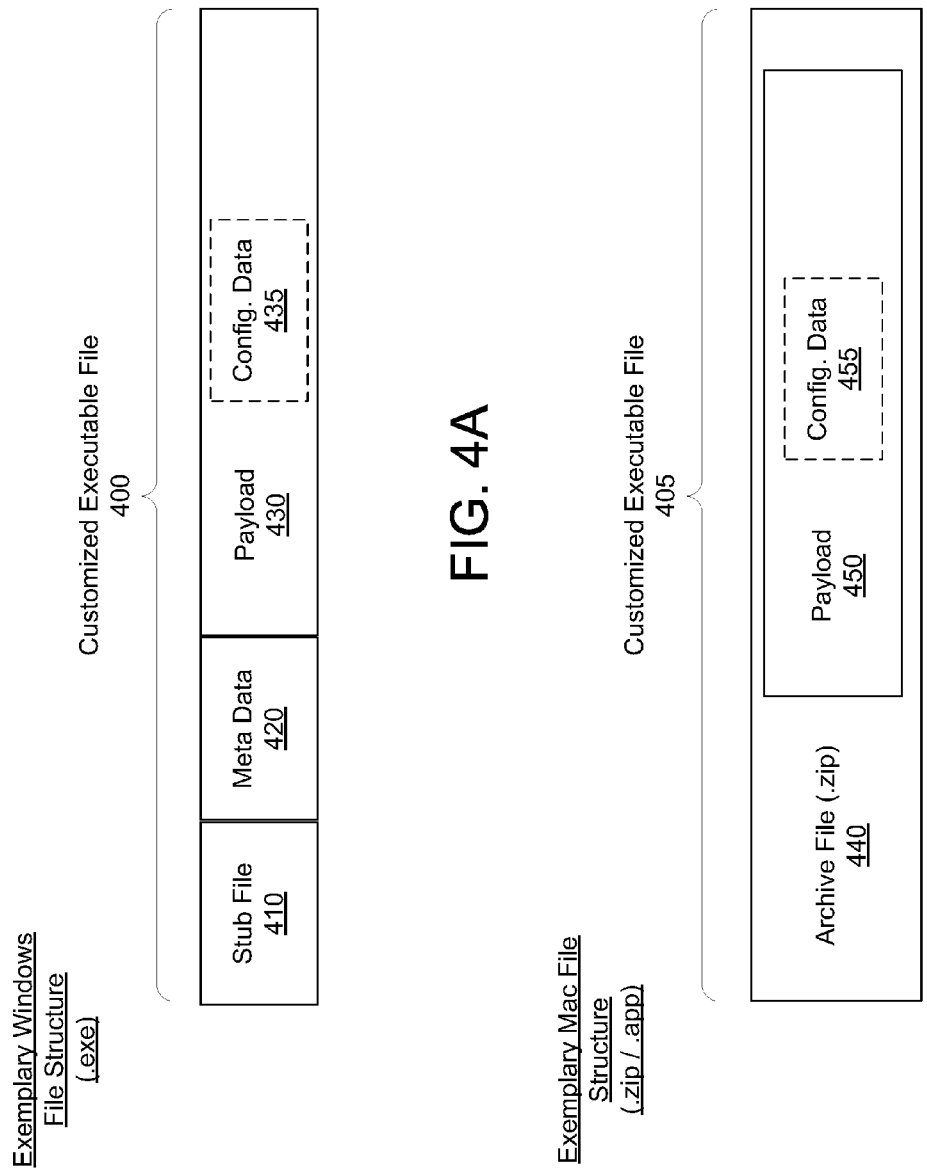

US 9,032,391 B2

SYSTEM AND METHOD FOR DYNAMICALLY CREATING EXECUTABLE FILES

CROSS-REFERENCE TO RELATED APPLICATIONS

This application claims the benefit of the following application which is incorporated by reference in its entirety, U.S. Provisional Application No. 61/665,154, entitled "SYSTEM AND METHOD FOR DYNAMICALLY CREATING EXECUTABLE FILES", filed Jun. 27, 2012.

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever. The following notice applies to the software and data as described below and in the drawings that form a part of this document: Copyright 2013, ClearSlide, Inc., All Rights Reserved.

TECHNICAL FIELD

The present disclosure relates to creating executable files in a communications network environment (e.g., the Internet), and more specifically, to generating customized executable files on a server for one or more clients.

BACKGROUND

A conventional method for distributing software is to deliver the software as executable files. A developer uses one or more programming languages (e.g., Java) to write software source codes that form a program, compiles the software source codes (e.g., using a compiler) into one or more executable files, and distributes these executable files via the Internet (e.g., by prompting users to download), a storage medium (e.g., a DVD disk, or a flash storage drive), or other suitable media. Then, the users install these files onto their computer and execute them to run the program.

In many cases, an executable file that is to be delivered to the users is "statically" created, that is, pre-compiled in advance. As such, the same executable file is delivered to all users without any regard to their individual differences, and once installed by a particular user, the user often needs to "personalize" the installed file to suit his or her own use. For example, a typical action that the particular user needs to perform after (or perhaps during) the installation is to enter a login information, a serial code, and/or other identification or access information, so that the application may further suit the user's need.

SUMMARY OF THE DESCRIPTION

In a first aspect, a method for dynamically creating executable files on a server is disclosed. The method includes receiving a download request from a client. The download request includes a system type and one or more identification parameters. The method further includes locating a pre-compiled payload that is executable on the client based on the system type. The method further includes determining a configuration data for use with the pre-compiled payload based on the one or more identification parameters. The method further includes selectively generating a customized executable file for the client to download. The customized executable file includes the pre-compiled payload and the configuration data. In some aspects, a system and a program for dynamically generating executable files are disclosed as well.

BRIEF DESCRIPTION OF DRAWINGS

The present embodiments are illustrated by way of example and are not intended to be limited by the figures of the accompanying drawings. In the drawings:

FIGS. 4A and 4B respectively illustrate two file structures of the customized executable files, each created based on a user's system type;

The same reference numbers and any acronyms identify elements or acts with the same or similar structure or functionality throughout the drawings and specification for ease of understanding and convenience.

DETAILED DESCRIPTION

Techniques are disclosed for generating, on a server, executable files that are individually customized for a user. An exemplary method comprises receiving a download request from a client, the download request including a system type and one or more identification parameters; locating a pre-compiled payload that is executable on the client based on the system type; determining a configuration data for use with the pre-compiled payload based on the one or more identification parameters; and selectively generating a customized executable file for the client to download, wherein the customized executable file includes the pre-compiled payload and the configuration data. Among other benefits, some embodiments provided herein enable dynamic creation and individual customization of executable files for a user so that conventional configuration or personalization steps after the user installs the files are avoided, thereby reducing time consumed and potential confusion caused by such steps.

Various examples of the present disclosure are now be described. The following description provides specific details for a thorough understanding and enabling description of these examples. One skilled in the relevant art will understand, however, that the embodiments disclosed herein may be practiced without many of these details. Likewise, one skilled in the relevant art will also understand that the present embodiments may include many other obvious features not described in detail herein. Additionally, some well-known methods, procedures, structures or functions may not be shown or described in detail below, so as to avoid unnecessarily obscuring the relevant description.

The techniques disclosed below is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

It is noted that, although the following description focuses specifically on applying the techniques disclosed herein to an exemplary browser-based screen sharing environment, these techniques may be applied to any suitable environment. Further, while the following description focuses on implementation details on a viewer device, these techniques may be applied to a presenter device as well.

Figure 1:
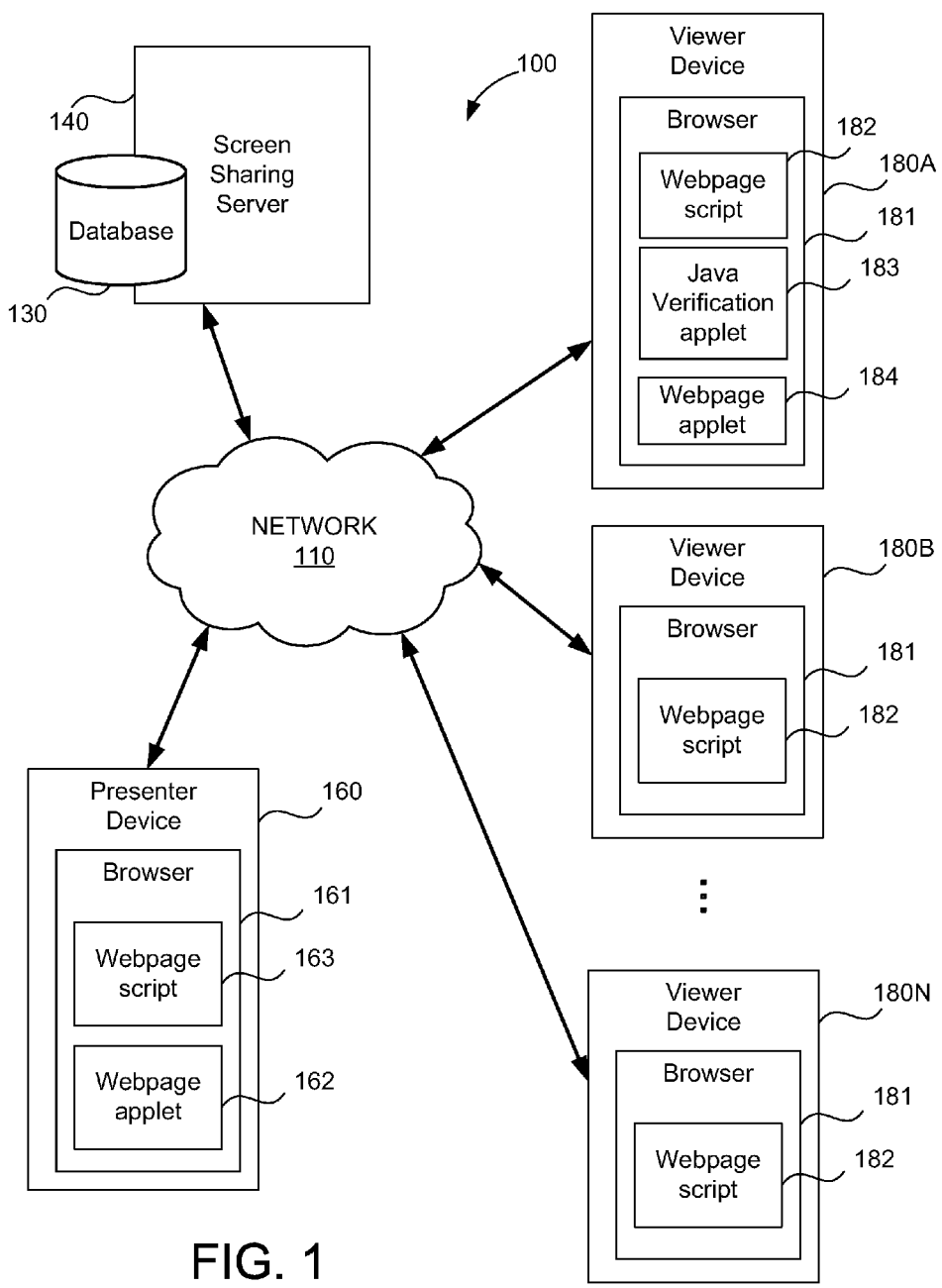
FIG. 1 illustrates an exemplary system within which the present embodiments are implemented.
Figure 2:
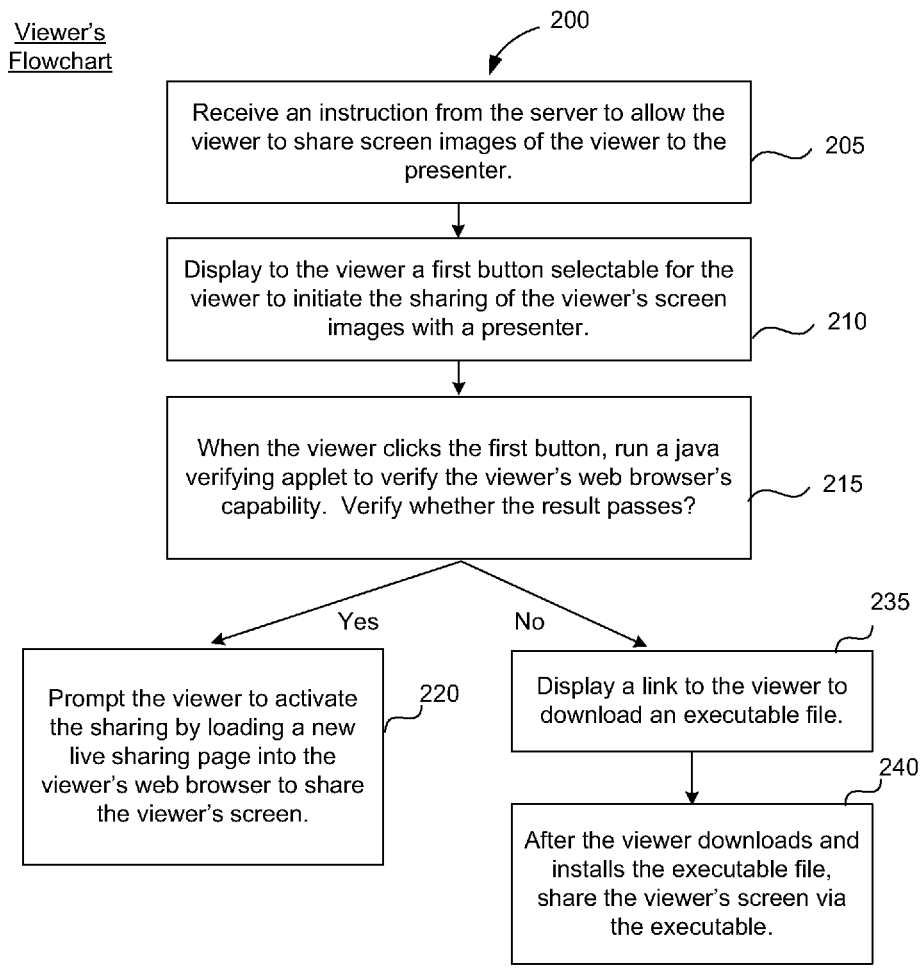
FIG. 2 depicts a flowchart illustrating exemplary actions performed on a viewer's device to share the viewer's screen with the presenter and other viewers.

FIG. 1 illustrates an exemplary system 100 within which the present embodiments are implemented. The system 100 includes a presenter operating a presenter device 160, one or more viewers operating viewer devices 180A-180N, a screen sharing server 140, and a network 110.

The viewer devices 180 and presenter device 160 may be any system and/or device, and/or any combination of devices/systems that is able to establish a connection, including wired, wireless, cellular connections with another device, a server and/or other systems such as screen sharing server 140. Viewer devices 180 and presenter device 160 typically include a display and/or other output functionalities to present information and data exchanged between or among the devices 180, 160 and/or the screen sharing server 140. In one embodiment, there is only a single screen sharing server 140. In one embodiment, there are multiple screen sharing servers 140 operating independently.

The viewer devices 180 and the presenter device 160 may include mobile, hand held, or portable devices, or non-portable devices and may be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a hand-held tablet (e.g., an iPad, a Galaxy, Xoom Tablet, etc.), a tablet PC, a thin-client, a hand held console, a hand held gaming device or console, an iPhone, and/or any other portable, mobile, hand held devices, etc. In one example, the viewer devices 180, screen sharing server 140, and presenter's device 160 are coupled via the network 110. In some other examples, the viewer devices 180, the presenter device 160, and screen sharing server 140 may be directly connected to one another.

The presenter device 160 and the viewer devices 180 should each be capable of running a web browser 161, 181. The viewer device web browser 181 is used by the viewer operating viewer device 180 to access a uniform resource locator (URL) to view a series of images of a shared screen of the presenter's device 160. The presenter device web browser 161 is used by the presenter to access a webpage with an embedded applet that permits remote control of the presenter's screen.

The input mechanism on viewer devices 180 and presenter device 160 may include, but is not limited to, a touch screen keypad (including single touch, multi-touch, gesture sensing in 2D or 3D, etc.), a physical keypad, a keyboard, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

The system 100 supports screen sharing of a presenter's screen on the presenter device 160 via the network 110 and the screen sharing server 140 to one or more viewers operating viewer devices 180A-180N, regardless of whether one or more typically required plugins (e.g., a Java plugin) are installed with viewers' browsers 181. U.S. patent application Ser. No. 12/953,054, entitled "METHOD AND SYSTEM FOR BROWSER-BASED SCREEN SHARING", filed Nov. 23, 2010, assigned to the present assignee, describes a method and system of permitting a presenter to share his screen with one or more viewers while the presenter is actively using the screen, e.g., moving the cursor, typing text, and opening a window, and is incorporated herein by reference in its entirety.

The system 100 also supports detection of inputs from the one or more viewers, regardless of whether one or more typically required plugins (e.g., a Java plugin) are installed with the viewers' browsers 181. U.S. patent application Ser. No. 13/484,253, filed May 30, 2012, entitled "METHOD AND SYSTEM FOR BROWSER-BASED CONTROL OF A REMOTE COMPUTER", assigned to the present assignee, provides a method and a system allowing one or more viewers, each using only a web browser, to interact with the image of the shared presenter's screen through the screen sharing server 140, and is also incorporated herein by reference in its entirety.

Generally, the presenter starts by providing to viewers a viewer URL that uniquely identifies the presenter. When a viewer goes to the viewer URL using a web browser, thereby loading a presentation viewing webpage, the viewer automatically sees a presentation slide or other content, such as images, selected by the presenter.

A particular presentation slide that may be selected by the presenter is a "live demo" slide, which loads a live sharing webpage containing a sharing applet or an embedded applet 162 (e.g., a Java applet) in a web browser 161 running on the presenter device 160. Upon receiving permission from the presenter (e.g., via a browser's security request to run Java applets), the applet 162 shares the presenter's screen with viewers who access the provided viewer URL without the viewer having to download any software or plug-ins. As the presenter moves the cursor on his screen, enters text, or interacts with the information displayed on the presenter's screen, the presenter's interactions are reflected on the viewer's monitors.

The webpage corresponding to the viewer URL provided by the presenter (i.e., the presentation viewing webpage) also contains an embedded script 182 (e.g., a Javascript and/or a series of AJAX code) that detects input or control events made by the viewer's input mechanism, such as mouse movements, clicks, mouse wheel rotations, or keyboard strokes, and sends the control events to the server 140. In addition, the applet 162 that is embedded in the live sharing webpage checks the server 140 for new viewer control events, executes them on the presenter's computer, and transmit images of the presenter's updated screen back to the viewer via the server 140.

During a live presentation (e.g., via the live demo slide) of an interactive sales pitch or a technical support session, it may also be beneficial to enable a viewer to share his or her screen to the presenter as well as to the other viewers. In many instances, it is often useful to allow viewers to share their screens instead of viewing the presenter's screen during the above-said screen sharing session, so that the original presenter can, for example, provide technical assistance to or further explain a detail on what is only visible on the remote, viewer's computer. Because the viewers may not share their screens on a frequent basis, the viewers typically do not have those required software or plugins installed, thereby causing delay, difficulty, and frustration.

Accordingly, system 100 also provides control switching capabilities for a presenter and one or more viewers to switch roles during a browser-based screen sharing session regardless of whether one or more plugins (e.g., a Java plugin) are installed with the viewers' browsers. For purposes of facilitating a better understanding of the techniques disclosed herein, various functions and configurations of system 100 are now described in conjunction with FIGS. 2 and 5A-6.

Figure 5A:
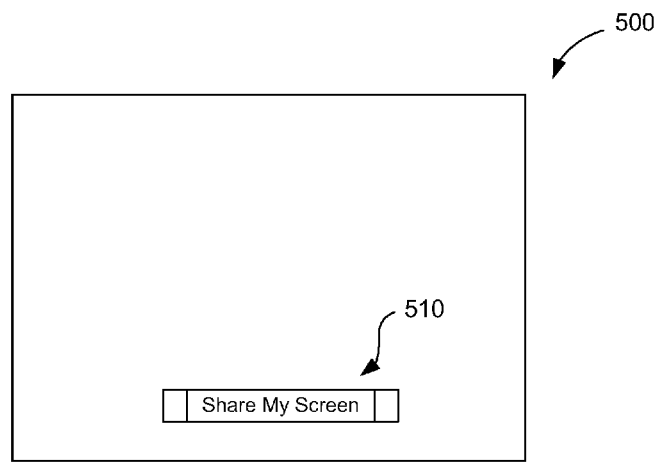
FIG. 5A illustrates a "Share My Screen" button in an exemplary screenshot of the viewer's screen that may appear when the presenter allows viewers to share their screens.
Figure 5B:
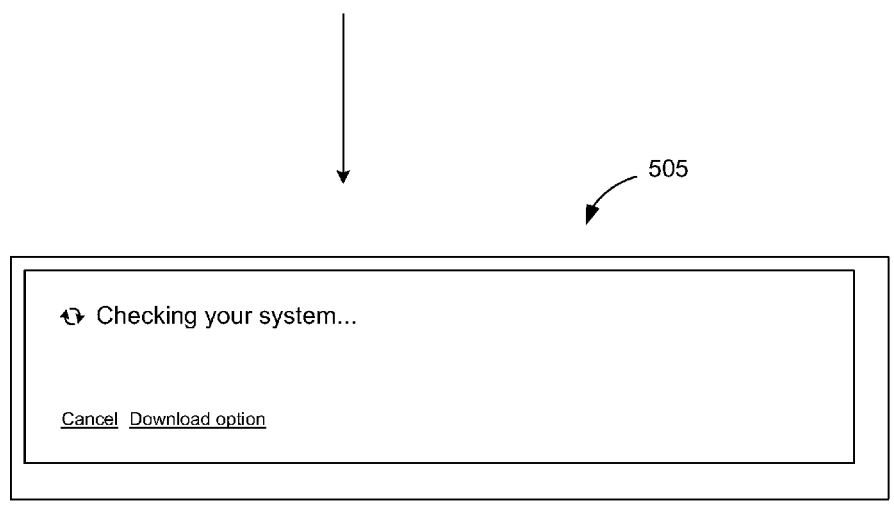
FIG. 5B illustrates a status window shown to the viewer after the viewer selects the "Share My Screen" button of FIG. 5A while an verifying applet checks the viewer's browser for Java compatibility.

More specifically in system 100, the presenter may allow the viewer to share the viewer's screen using a user interface element. The presenter may explicitly select a link, provided by applet 162, to give a permission that allows the viewer to share the viewer's screen images. After the presenter gives the permission, all viewers' devices receive (205) an instruction from the server 140 so that any one of the viewers can now choose to share his or her screen. A "Share My Screen" (SMS) button, such as button 510 shown on screenshot 500 of FIG. 5A, is then delivered from the server 140 to be displayed (210) by script 182 on each viewer's screen (e.g., in the presentation viewing webpage). The SMS button 510 is selectable for the viewer to initiate sharing of screen images of the viewer to the presenter and, optionally, with other viewers. The presentation viewing webpage may also include a detecting script (e.g., which may be included in script 182) that detects the viewer's selection of the button 510.

Upon the viewer selecting the button 510, the server 140 selectively enables the viewer to share the viewer's screen images with the presenter based on a result of a verification of the browser 181's capability. More specifically, when the viewer clicks the SMS button 510, a verifying script (e.g., which may be included in script 182) that is embedded within the viewer's presentation viewing webpage starts (215) a process to determine which method is available for sharing the viewer's screen images. More specifically, the verifying script triggers the viewer's web browser 181, then runs a "java verification" or a verifying applet 183 on the viewer's device 180A. The verifying applet 183 may determine if one or more required software (e.g., Java) is installed and whether the installed version of the required software meets at least the minimum acceptable standards for running the verifying applet 183 and/or for running a sharing applet that is similar to applet 162 of FIG. 1.

If the viewer's web browser 181's capability is verified, then the verifying applet 183 prompts (220) the viewer to activate the sharing of the viewer's screen images to the presenter device 160 and other viewer devices 180B-180N.

Figure 6:
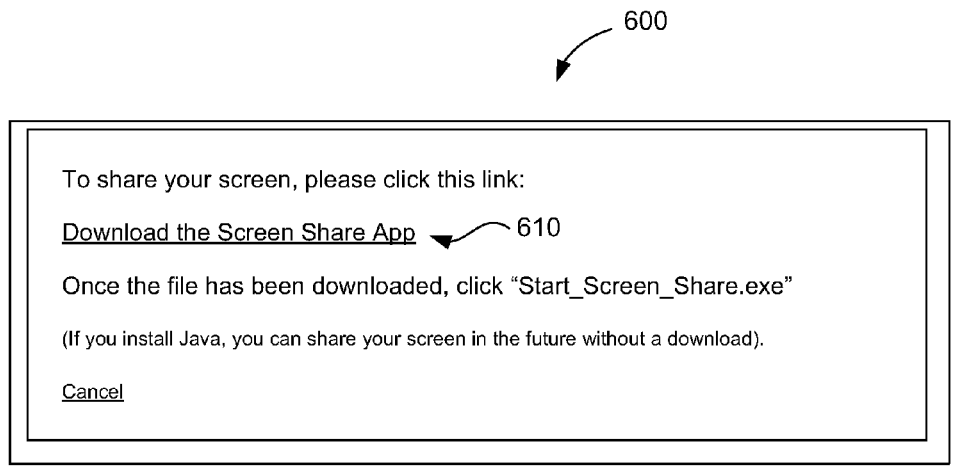
FIG. 6 illustrates an exemplary screenshot of the viewer's screen requesting that the user download an executable screen share application to enable the viewer to share his or her screen.

If the viewer's web browser 181's capability is not verified (e.g., if the acknowledgement and/or the presenter token is not received from the server 140 after a predetermined amount of time), the script 182 prompts (235) the viewer with a link, such as link 610 shown on screenshot 600 of FIG. 6, to download an executable file from the server 140 or another location in the network 110. The executable file, upon being executed by the viewer, facilitates (240) the viewer in sharing the viewer's screen images via the executable file, through server 140, to the presenter and other viewers. The executable file may load a new sharing applet to perform the functions of sharing applet 184, or the executable file may itself perform similar functions as the sharing applet 184.

The embodiments disclosed herein recognize that, if the executable file is to be delivered to the viewer using the aforementioned conventional methods, they will require additional customization or personalization steps, which consume extra time and create additional technical difficulties. In some cases, especially when time is of the essence, these additional steps may cause confusion and/or may become a source of disappointment. The additional steps may also be particularly frustrating when the presentation is a technical support session in which the viewer is likely to be not technically apt. In a conventional attempt to solve this issue, some developers first request that a user download a small installer (also known as a "kick-starter"), which collects data from the user and then further downloads and installs another executable file based on the collected data. This kick-starter approach is less than ideal because it also calls for a time-consuming and confusing, multi-step process.

In accordance with some embodiments, the server 140 (or a separate file server coupled to the network 110, not shown in FIG. 1 for simplicity) may individually and automatically customize and generate the executable file for a user such as the viewer operating the viewer device 180A. More specifically, when the viewer selects link 610 displayed by the script 182 to download the executable file from the server 140, the script 182 automatically sends to the server 140 a download request including a system type and one or more identification parameters. In other implementations, the viewer may supply data using other suitable methods to communicate with the server 140 for the customization of the executable file. Exemplary data may include user identification information, data which describe specifics around how the executable file should operate, and/or other suitable information.

After the server 140 receives the download request (e.g., sent from the script 182) from the viewer, the server 140 employs the data included in the download request to create a customized executable file, which corresponds to the data and parameters supplied by the viewer, and makes the customized executable file available for download by the viewer. More implementation details regarding the automatic customization and generation of the executable file are described below in connection to FIGS. 3, 4A and 4B.

Figure 3:
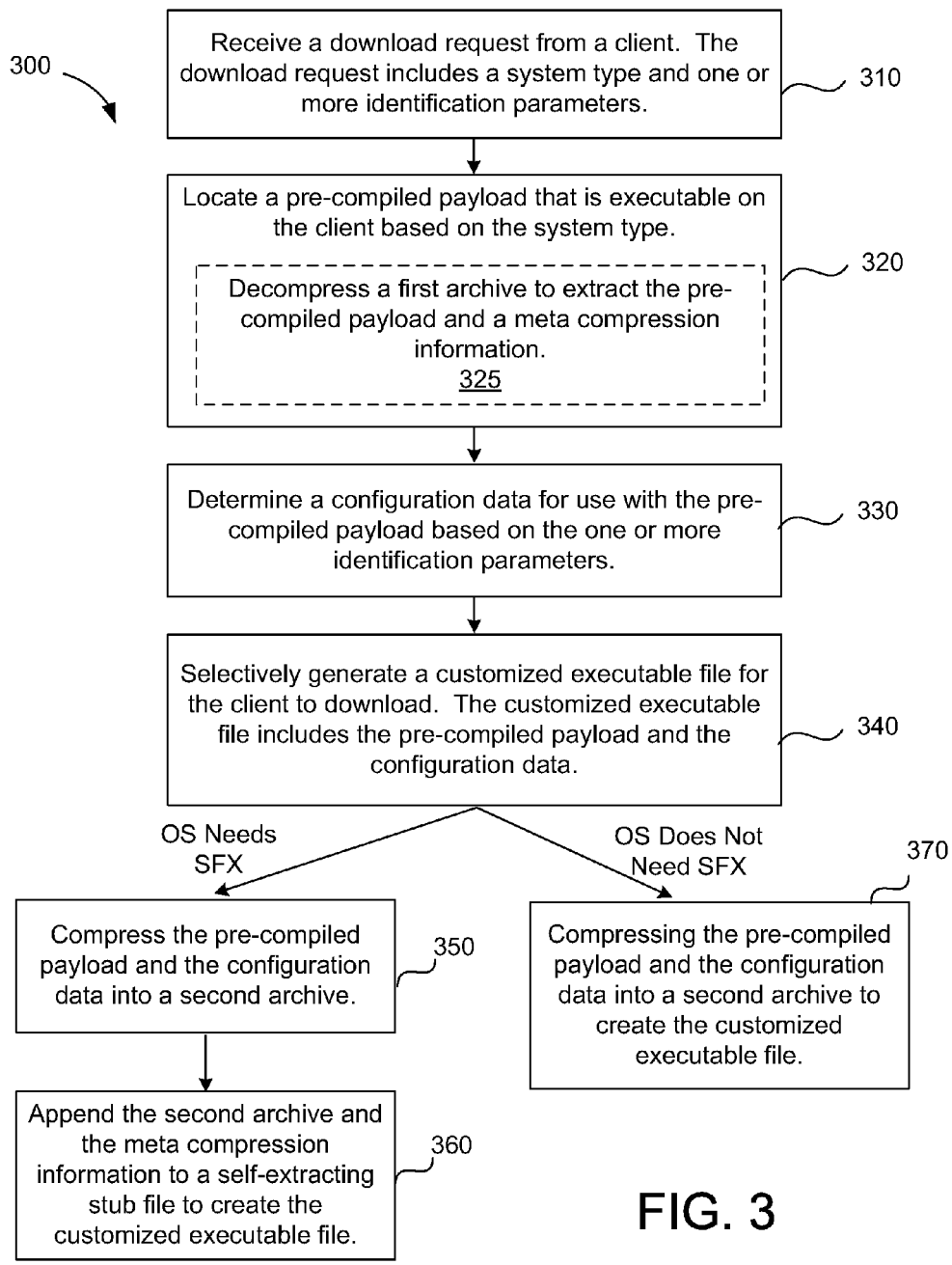
FIG. 3 depicts a flowchart illustrating exemplary actions performed on a server for dynamically creating a customized executable file for a user such as the viewer of FIG. 1.

FIG. 3 depicts a flowchart 300 illustrating exemplary actions performed on a server for dynamically creating a customized executable file for a client such as the viewer of FIG. 1. In some embodiments, the customized executable file, upon being executed on the client, facilitates the client in sharing screen images of the client via a pre-compiled software payload (which may be included in the customized executable file), through the server, to a viewer.

First, with reference to FIGS. 1 and 4A-4B, a server (e.g., the server 140, FIG. 1) receives (310) a download request (e.g., automatically sent from the script 182, FIG. 1) from a client (e.g., the viewer device 180A). In some embodiments, the download request includes a system type and one or more identification parameters. Depending on the application, the download request may have other suitable parameters including, for example, a requested version of a particular software such as Java, and/or certain security information.

Then, the server 140 locates (320) a pre-compiled payload that is executable on the client 180A based on the system type. In one example, the payload may be stored on the server 140 in form of a software that is executable on the client 180A. According to some embodiments, the software payload may, upon being executed on the client 180A, establish a virtual machine (e.g., a Java Virtual Machine (JVM)) to execute bytecode programs. Additionally, the bytecode programs may include a sharing applet (e.g., the applet 184, FIG. 1) that causes the server 140 to relay screen images of the client 180A from the client 180A, through the server 140, to a viewer (e.g., the presenter device 160).

In some other examples, the payload may be stored on the server 140 in the form of a compressed archive that contains the payload. In the cases that the payload is stored as a compressed archive, the server 140 may decompress (325) the archive to extract the pre-compiled payload and a meta compression information that records the details of how the archive is compressed. The meta compression information may be reused by the server 140 at a later step (e.g., step 360).

Next, based on the one or more identification parameters received, the server 140 determines (330) a configuration data for use with the pre-compiled payload. More specifically, in one or more embodiments, the configuration data contains appropriate files, for example, identity information of the viewer device 180A and/or information regarding the presenter device 160, that may be used to automatically customize the pre-compiled payload when the payload is executed on device 180A, so that no personalization or setup steps are needed after the viewer runs the executable file.

Thereafter, the server 140 selectively generates (340) a customized executable file for the client to download. The customized executable file includes the pre-compiled payload and the configuration data. One or more embodiments disclosed herein provide that the server 140 selectively generates the customized executable file based on the system type.

FIGS. 4A and 4B respectively illustrate two abstract file structures of the customized executable files, each created based on the user's system type. FIG. 4A illustrates an exemplary customized executable file 400 that is created for a first type of system that needs an executable self-extractor (e.g., a Microsoft Windows operating system). The file 400 includes a self-extracting stub file 410, a meta compression data 420, a payload 430, and a configuration data 435. FIG. 4B illustrates an exemplary customized executable file 405 that is created for a second type of system that does not need an executable self-extractor (e.g., a Macintosh operating system). The file 405 includes a self-extracting archive 440, a payload 450, and a configuration data 455.

If the system type is a Windows system, then the server 140 (i) compresses (350) the pre-compiled payload (e.g., payload 430, FIG. 4A) and the configuration data (e.g., data 435, FIG. 4A) into a second archive (represented collectively by payload 430 and data 435 for simplicity), and (ii) appends (360) the second archive and the meta compression information (e.g., data 420, FIG. 4A) to a self-extracting stub file (e.g., file 410, FIG. 4A) to create the customized executable file (e.g., file 400, FIG. 4A). In particular, the stub file 410, upon being executed on the viewer device 180A, is able to automatically decompress the second archive according to the meta compression information 420 and execute the pre-compiled payload 430, which is automatically tailored to the client's preferences and/or characteristics according to the configuration data 435.

If the system type is a Macintosh system, then the server 140 compresses (370) the pre-compiled payload (e.g., payload 450, FIG. 4B) and the configuration data (e.g., data 455, FIG. 4B) into a second archive (e.g., file 440, FIG. 4B) to create the customized executable file (e.g., file 405, FIG. 4B). In particular, after the client downloads and executes the file 405 (e.g., by double-clicking), the Macintosh system automatically decompresses the second archive, and the payload 450 appears as an executable application to the user. When the user runs the payload 450, the payload 450 automatically accesses the configuration data 455 so that automatically it is tailored to the client's preferences and/or characteristics according to the configuration data 455.

Notably, in some embodiments, when the server 140 generates the customized executable file including the pre-compiled payload for the client, the generation is performed within the server 140's memory (not shown for simplicity) and via Input/Output streams so that no data is stored in a storage disk. Also, in some embodiments, the customized executable files discussed herein are automatically deleted upon exiting of the software payload. These techniques may provide additional performance and/or security benefits.

In this way, the server 140 enables dynamic creation and individual customization of executable files for a user so that conventional configuration or personalization steps after the user installs the files are avoided, thereby reducing time consumed and potential confusion caused by such steps.

In the foregoing specification, the examples have been described with reference to specific exemplary implementations thereof. It will, however, be evident that various modifications and changes may be made thereto without departing from the broader scope of the disclosure. The specification and drawings are, accordingly, to be regarded in an illustrative sense rather than a restrictive sense.

What is claimed is:

1. A computer-implemented method for enabling a viewer to perform screen sharing, the method comprising:
   transmitting, to a browser of the viewer, a script configured to (i) display a sequence of images sourced from a browser of a presenter, via the file server, on the viewer's browser in response to control of the sequence by the presenter, and (ii) in response to a request for a screen sharing executable from the viewer, generate a download request including a system type and one or more identification parameters;
   wherein the script displays the sequence of images on the viewer's browser without requiring the viewer's browser to run an applet;
   receiving, at the file server, the download request from the script;
   locating, using the file server, a pre-compiled payload suitable for execution on a computer of the viewer based on the system type;
   determining, using the file server, a configuration data for use with the pre-compiled payload based on the one or more identification parameters; and
   generating, using the file server, a customized executable file for the viewer to download, wherein the customized executable file includes the pre-compiled payload and the configuration data, wherein the pre-compiled payload, upon being executed, establishes a virtual machine to execute bytecode programs, and wherein the bytecode programs include a sharing applet that causes the file server to relay screen images of the viewer from the viewer, through the file server, to a presenter.

2. The method of claim 1, wherein the locating comprises:
   decompressing a first archive to extract the pre-compiled payload and a meta compression information.

3. The method of claim 2, wherein the selective generating is based on the system type and comprises:
   if the system type is a first type that needs an executable self-extractor,
   (i) compressing the pre-compiled payload and the configuration data into a second archive; and
   (ii) appending the second archive and the meta compression information to a self-extracting stub file to create the customized executable file.

4. The method of claim 2, wherein the selective generating is based on the system type and comprises:

if the system type is a second type that does not need an executable self-extractor, compressing the pre-compiled payload and the configuration data into a second archive to create the customized executable file.

5. The method of claim 1, wherein the customized executable file, upon being executed on the viewer, facilitates the viewer in sharing screen images of the viewer via the pre-compiled payload, through a screen sharing server, to the presenter.

6. The method of claim 5, wherein the file server comprises the screen sharing server.

7. The method of claim 1, wherein the pre-compiled payload and the sharing applet are automatically configured according to the configuration data.

8. A system for generating files, the system comprising:
a processor; and
a memory coupled to the processor and storing a plurality of instructions which, when executed by the processor, cause the processor to:
transmit, to a browser of the viewer, a script configured to (i) display a sequence of images sourced from a browser of a presenter, via the file server, on the viewer's browser in response to control of the sequence by the presenter, and (ii) in response to a request for a screen sharing executable from the viewer, generate a download request including a system type and one or more identification parameters;
wherein the script displays the sequence of images on the viewer's browser without requiring the viewer's browser to run an applet;
receive the download request from the script;
locate a pre-compiled payload suitable for execution on a computer of the viewer based on the system type;
determine a configuration data for use with the pre-compiled payload based on the one or more identification parameters; and
generate a customized executable file for the viewer to download, wherein the customized executable file includes the pre-compiled payload and the configuration data, wherein the pre-compiled payload, upon being executed, establishes a virtual machine to execute bytecode programs, and wherein the bytecode programs include a sharing applet that causes the file server to relay screen images of the viewer from the viewer, through the file server, to a presenter.

9. The system of claim 8, wherein the instructions further cause the processor to:
decompress a first archive to extract the pre-compiled payload and a meta compression information.

10. The system of claim 9, wherein the processor generates based on the system type, and wherein the instructions further cause the processor to:
if the system type is a first type that needs an executable self-extractor,
(i) compress the pre-compiled payload and the configuration data into a second archive; and
(ii) append the second archive and the meta compression information to a self-extracting stub file to create the customized executable file.

11. The system of claim 9, wherein the processor generates based on the system type, and wherein the instructions further cause the processor to:
if the system type is a second type that does not need an executable self-extractor, compress the pre-compiled payload and the configuration data into a second archive to create the customized executable file.

12. The system of claim 8, wherein the customized executable file, upon being executed on the viewer, facilitates the viewer in sharing screen images of the viewer via the pre-compiled payload, through a screen sharing server, to the presenter.

13. The system of claim 12, wherein the file server comprises the screen sharing server.

14. The system of claim 8, wherein the pre-compiled payload and the sharing applet are automatically configured according to the configuration data.

15. A non-transitory storage medium storing a plurality of instructions which, upon being loaded into a memory of a server, cause the server to:
transmit, to a browser of the viewer, a script configured to (i) display a sequence of images sourced from a browser of a presenter, via the file server, on the viewer's browser in response to control of the sequence by the presenter, and (ii) in response to a request for a screen sharing executable from the viewer, generate a download request including a system type and one or more identification parameters;
wherein the script displays the sequence of images on the viewer's browser without requiring the viewer's browser to run an applet;
receive the download request from the script;
locate a pre-compiled payload suitable for execution on a computer of the viewer based on the system type;
decompress a first archive to extract the pre-compiled payload and a meta compression information;
determine a configuration data for use with the pre-compiled payload based on the one or more identification parameters; and
generate a customized executable file for the viewer to download based on the system type, wherein the customized executable file includes the pre-compiled payload and the configuration data.

16. The medium of claim 15, further causes the server to:
if the system type is a first type that needs an executable self-extractor, (i) compress the pre-compiled payload and the configuration data into a second archive; and (ii) append the second archive and the meta compression information to a self-extracting stub file to create the customized executable file; and
if the system type is a second type that does not need an executable self-extractor, compress the pre-compiled payload and the configuration data into a third archive to create the customized executable file.

* * * * *